United States Patent [19]

Neves et al.

[11] 4,185,650
[45] Jan. 29, 1980

[54] METHOD AND APPARATUS FOR TROUBLE-SHOOTING AND IRRIGATION SYSTEM

[76] Inventors: William T. Neves, 856 Linda Vista St., San Jose, Calif. 95127; Anthony R. Salvador, 511 Webster Dr., Martinez, Calif. 94553

[21] Appl. No.: 971,536

[22] Filed: Dec. 20, 1978

Related U.S. Application Data

[63] Continuation of Ser. No. 807,878, Jun. 20, 1977, abandoned.

[51] Int. Cl.² ............................................. A01G 25/00
[52] U.S. Cl. .................................. 137/15; 137/624.2; 239/69; 343/225; 325/37
[58] Field of Search ............... 325/37, 392; 343/225; 137/624.18, 624.2, 15, 315; 239/66, 69

[56] References Cited
U.S. PATENT DOCUMENTS 3,699,578  10/1972  Fiorentino ......................... 343/225

*Primary Examiner*—Alan Cohan
*Attorney, Agent, or Firm*—Warren, Chickering & Grunewald

[57] ABSTRACT

A method and apparatus for trouble-shooting an irrigation system having a plurality of independently operable irrigation branches and an automatic controller for control of water flow in the branches is disclosed. A radio transmitter and a radio receiver are tuned for the transmission and receipt of two differing signals. The receiver is electrically connected to the controller at a position between the timing apparatus and the rapid station advance motor and at a position enabling direct actuation of water flow. The radio receiver produces output signals actuating the controller in response to the received radio signals. Thus, one radio signal is used to select the branch of the irrigation system through which water is to flow, and the other radio signal is used to trigger flow of water in the selected branch. The radio transmitter is employed from a position remote of the receiver and controller so that the irrigation line can be tested, repaired and re-tested by a single person, who actuates the irrigation system while at a position remote from the controller.

7 Claims, 1 Drawing Figure

METHOD AND APPARATUS FOR
TROUBLE-SHOOTING AND IRRIGATION
SYSTEM

This is a continuation of application Ser. No. 807,878, filed June 20, 1977, now abandoned.

BACKGROUND OF THE INVENTION

The use of electrical and hydraulic controllers as a means for the selective control of valves in large irrigation systems having a plurality of independent branches or lines is widespread. Such controllers have been employed in farming applications, large real estate development projects, golf courses, and a myriad of other irrigation applications. The irrigation systems usually are comprised of a source of water, a plurality of independently operable irrigation branches connected to the water supply, a valving network or system and a controller, which is formed and connected to selectively open and close valves so that water can be communicated to various sprinkler heads or other water outlets for a known period of time. Such controllers may either be electronic and coupled to solenoid valves or fluid (usually hydraulically) actuated and connected to correspondingly formed valves. Either kind of controller will virtually always include a timing mechanism enabling irrigation of various areas in the multi-branched system on a programmed or pre-planned basis.

The following United States patents are illustrative of irrigation systems which employ a central controller to enable selective irrigation of individual branches in a multi-branched irrigation system: U.S. Pat. Nos. 3,578,245, 3,599,867, 3,653,595 and 3,726,477. The first three of these patents disclose systems in which the master controller is directly wired to either a solenoid valve or to slave stations which control operation within a branch or irrigation zone. U.S. Pat. No. 3,726,477 is similar in nature except that instead of providing for wiring back to a central controller, the central controller includes a radio transmitter which is used to broadcast signals from a central location to satellite or slave stations. The command signals from the central transmitter are encoded so as to activate only selected ones of the slave receivers, but the system basically substitutes radio transmission for the completely wired systems previously employed.

In addition to the four above set forth patents, U.S. Pat. Nos. 3,227,219 and 3,420,270, relating only peripherally to sprinkler systems and multi-branch irrigation controllers, were located during preliminary patent research.

Unfortunately, any large irrigation system will experience a certain number of failures, and the above set forth irrigation systems and controllers are not designed or well suited to deal with such failures. Whether the controller is one which depends on electric wires, radio transmission or hydraulic lines, the problem is the same, namely, the failure occurs at a location which is remote from the controller. The current process for repairing lines requires a man located at the controller and a second man located in the field who does the repair work. On command from the person in the field, the controller can be used to turn on the water and open and close valves until it is directed to the affected branch of the irrigation system. Once the trouble spot is located, the man in the field directs the man at the controller to shut down the system for repairs, and after the repairs are made, the man in the field directs the man on the controller to turn on the system for testing. Many times, distance or the presence of buildings or other obstructions makes visual and unaided audio communication impossible. Accordingly, such testing often requires that both men additionally have special communications equipment, such as a walkie-talkie, to enable communication of the commands. Unfortunately, some repairs may require a very substantial period of time and thereby tie up two men and their associated equipment undesirably, although only one is actually doing the work.

SUMMARY OF THE INVENTION

Objects of the Invention

Accordingly, it is an object of the present invention to provide a method and apparatus which enables the location, repair and testing of failures in automatically controlled, multi-branched irrigation systems by a single man at positions remote from the apparatus normally controlling the operation of the irrigation system.

It is another object of the present invention to provide a method and apparatus for trouble-shooting irrigation systems which are adaptable for use with electric controllers, employing either wired or radio transmitted signals to control valves, as well as hydraulically actuated controllers.

It is a further object of the present invention to provide a trouble-shooting method and apparatus for an irrigation system which enables a substantial water savings in connection with the location, repair and testing procedures; is failsafe in its operation; greatly reduces the time and manpower required to effect repairs; is durable and simple to operate; and can be easily attached and used with a wide range of existing irrigation controllers.

The method and apparatus for trouble-shooting an irrigation system of the present invention has other objects and features of advantage which will become apparent from or are set forth in the detailed description of the preferred embodiment and the accompanying drawing.

Brief Summary

The method for trouble-shooting an irrigation system of the present invention is comprised, briefly, of the steps of selecting a radio receiver formed and tuned for receipt of both a water supply signal and a differing station selection signal, electrically connecting the receiver to a water supply control portion of controller means and to a branch selection portion of the controller means for actuation thereof, carrying a radio transmitter formed for transmission of the water supply and station selection signals back to the receiver, transmitting the station select signal approximate a suspected source of trouble in the irrigation system, transmitting a water supply signal, terminating the water supply signal, and after repair of the line, transmitting a second water supply signal to enable testing of the system. The apparatus of the present invention includes a receiver and transmitter, with the receiver being electrically connected to controller means at an electrical position in the controller means by-passing the timing function of the controller means, with the receiver being .ormed to produce output signals to the controller ̄eans, in response to radio transmissions, which output signals are suitable for direct control of the branch in which water can flow and commencement and termination of the flow of water.

DESCRIPTION OF THE PREFERRED EMBODIMENT

Figure 1:
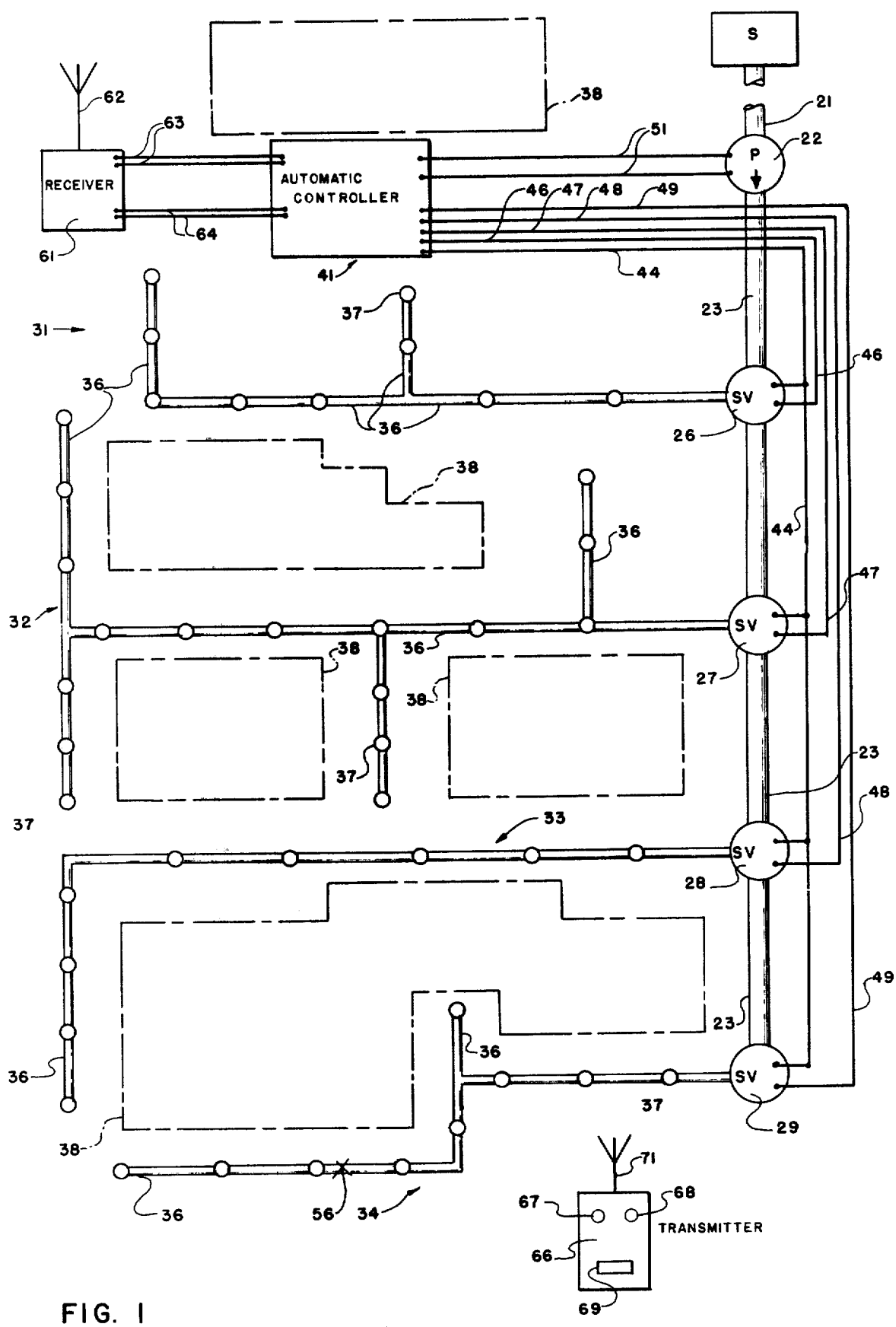
FIG. 1 is a schematic top plan view of an irrigation system showing the apparatus constructed in accordance with the present invention and use of the method of the present invention.

As shown in the drawing, a source of water S, such as a well, storage tank or the like, is connected by conduit 21 to a pump 22 formed to pump water down a main supply conduit 23 to a plurality of valves 26, 27, 28 and 29. Extending from and in fluid communicaiton through valves 26–29 are a plurality of independent irrigation branches, generally designated 31, 32, 33 and 34. Each of branches 31–34 typically will be formed as conduits 36 which communicate water to sprinkler heads 37 positioned at predetermined intervals over the length of branch conduits 36. As shown in FIG. 1, the branches 31–34 are positioned to extend about structures 38 (shown in phantom) which might, for example, represent the buildings in a condominium project. As used in the present application, however, the expression "branches" shall include a single valve and a single water outlet, as well as multiple valves and outlets connected to operate as a unit, such as the commercially available valve-in-hand systems which can take either configuration.

In order to control the flow of the water from the source S to selected ones of branches 31–34 of the irrigation system of FIG. 1, a central controller, generally designated 41, is provided which is shown operably connected to pump 22 and each of valves 26–29. Controller 41 has a water supply control portion formed to enable pump 22 to be selectively turned on and off and a branch selection portion formed to enable each of valves 26–29 to be selectively opened or closed.

It is important to note that pump 22 will not be required if the source of water S is pressurized, for example, when the source is a municipal water supply or gravity fed storage system. In such a case, the pump 22 may be replaced by a master control valve, not shown, but even more commonly, the entire main supply conduit is constantly provided with a pressurized supply of water. When conduit 23 is constantly supplied with water controller 41 will conventionally include an "off" station or branch at which none of valves 26–29 is "on." Thus, there will be no flow of water in the system until the branch select portion of the controller is advanced from the "off" station to actuate one of valves 26–29. In this form of irrigation system, the branch or station selection portion incorporates the water supply portion of the controller.

In the illustration of FIG. 1, controller 41 is a conventional electric controller which is wired by means of common line 44 and individual lines or electrical conductors 46, 47, 48 and 49, respectively, to valves 26–29. In the illustrated system, controller 41 is also wired by electrical conductors 51 to control pump 22.

Controller 41 can be formed in a number of different manners, and virtually any of the numerous commercially available electric controllers can be adapted for use of the present method and apparatus. Such controllers will be formed to include a timing function which allows a pre-programmed selection of which of branches 31–34 will receive water, when the water will be flowing in the branches, and for how long the water flows in the branches. One typical controller with which the apparatus and method of the present invention can be used is the RAIN-CLOX Model ME-11 produced by Rainbird Sprinkler Manufacturing Corp. of Glendora, Calif.

As thus far described, the irrigation system and controller therefor are conventional in every respect, and it is an important feature of the present invention that the method and apparatus be adaptable to a wide range of conventional multi-branched irrigation systems.

Description of the present apparatus and its use in trouble-shooting the irrigation system of FIG. 1 can be illustrated by assuming that there is a break at 56 in conduit 36 of branch 34 of the system. Generally, it will be obvious from the performance of branch 34 that there is a malfunction in the branch, although the precise location of break 56 may not be easily determined, particularly if conduit 36 is underground. In any event, there are no less than three buildings 38 between controller 41 and the break 56 which essentially eliminates the possibility of unaided audio and/or visual signalling between a repairman at break 56 and a controller operator at the controller 41.

In the method of the present invention, repair of the break 56 is accomplished through use of the apparatus of the present invention by a single man. The first step is to select or provide a radio receiver 61 which is formed and tuned for receipt of a water supply signal and a differing station selection signal. The details of construction of receiver 61 are not shown, since they are conventional in nature and well known in the art. The receiver, however, will include antenna 62 and may be crystal controlled and tuned to a predetermined transmitting frequency. Receiver 61 can advantageously include a frequency controlled local oscillator and time discrimination means so that selectivity can be obtained to avoid energizing of the circuits as a result of spurious noises. The radio receiver is formed to either generate an electrical output signal which triggers a function of the controller or act as a switch which opens or closes a circuit. Thus, the water supply radio signal triggers a corresponding output signal or closes a switch, and the station selection radio signal produces a corresponding output signal or switch actuation. These functions of the receiver are coupled electrically to the controller by pairs of output connections 63 and 64 in a manner which will be described in more detail hereinafter.

In the preferred form of receiver 61 of the present invention, the two differing radio signals which are sensed by the receiver are used to activate two solenoids, which close normally open switches. A first of the normally open switches is electrically connected to the pump P circuit (including conductors 51) at a position downstream of or by-passing the timing function of the controller. Conductors 63 can be connected to form a circuit with the pump and a power source in which the only open portion is the first solenoid activated switch in receiver 61.

As above described, many irrigation systems do not have a pump or main water control valve but instead have a constant source of pressurized water in main conduit 23. In these systems, conductors 63, which are electrically connected to the first, are in turn electrically connected to controller 41 by, in effect, mounting the first switch in common line 44. This can be done by disconnecting common return line 44 from the terminal strip in the controller and connecting the line to one of conductors 63, while the remainder of conductors 63 is connected to the terminal strip in place of line 44. With this connection and coupling of conductors 64 to the branch or station selection portion of the controller, the branch can first be selected, but the valve corresponding to the branch selection will not open until the return line 44 is closed by closing the first switch in the receiver by the necessary radio signal. Once the first switch is closed, the valve from main supply conduit 23 will open, causing water to flow. Thus, the first solenoid activated switch in the receiver acts as actuating means in the receiver formed to actuate the water supply portion of the controller.

In either the illustrated system or a pressured main supply conduit system, both of conductors 64 are connected to the controller at a position which by-passes or is electrically downstream of the timing mechanism conventionally employed in automatic controllers. This can be readily accomplished by connecting conductor 64 to controller 41 at a position electrically between the timing mechanism or circuit (usually a 24-hour clock) and the rapid station advance motor. When a second solenoid activated switch in receiver 61, which controls the branch selection, closes, a circuit is completed which activates the rapid advance motor and causes the branch selection to advance a station or stations. Opening of the branch selection switch in receiver 61 stops the rapid advance motor. Thus, the second solenoid switch also forms a part of actuation means in the receiver formed to actuate the branch selection control portion of the controller.

Although schematically shown in FIG. 1 as electrical conductors 63 and 64 extending from controller 41, it is preferable and a feature of the present invention to provide first plug means (not shown) at the controller. The first plug means is internally wired by electrical conductors to the water supply portion and station selection portions of the controller at points by-passing the clock as above described, and receiver 61 is provided with mating second plug means so that the receiver can simply be plugged into the controller to effect electrical connection. A user having a plurality of controllers, therefore, can periodically test or trouble-shoot a plurality of irrigation systems by plugging the receiver of the present invention into each of the controllers, which have been modified to have the first plug means wired to by-pass the timing mechanism.

After electrically connecting the radio receiver to controller 41, the trouble-shooter or repair man can carry a radio transmitter 66 to a position proximate the suspected source of trouble or break 56. Transmitter 66 is formed to transmit the water supply signal and the station select signal, which signals are differing from each other and are preferably amplitude modulated signals. For example, signals can be broadcast on a carrier frequency in the range of the 49.83 MHz or 49.86 MHz bands. The control frequencies on the carrier frequency can conveniently be a mixture of 300 and 800 Hz for the water supply signal and a mixture of 800 and 1,300 Hz for the station selection signal. The carrier and control frequencies can both be varied within the scope of the present invention. The control frequencies will be encoded, modulated onto the carrier frequency and transmitted to receiver 61 upon activation by buttons or switches 67 and 68. Upon receipt by receiver 61, the corresponding actuated switch in the receiver will close, advancing the station selected and enabling the water to be turned on and off. The transmitter will also conveniently be provided with an off and on switch 69 and a conventional antenna 71.

It is a feature of the present invention that the transmitter be constructed so that both of the water supply and the station selection signals will be transmitted only when the manually engageable radio signal switch means or buttons 67 and 68 are depressed or moved to the "on" position, and the transmitter is constructed so that they will be automatically or normally biased to an "off" position to terminate signal transmission. This is particularly important in connection with the water supply function and ensures that the system will not continue to supply water in the event that the transmitter is dropped or set down.

Once the transmitter 66 is proximate break 56, button 67 is depressed to send a station selection signal to receiver 61. The station select signal is decoded at the receiver, and the solenoid switch electrically connected through conductors 64 to the rapid advance motor is closed, which causes the controller to step ahead or advance to the next station. The button 67 can be held down or repeatedly depressed until the controller is stepped ahead to a position activating solenoid valve 29 and branch 34 of the irrigation system. The branch activated can be determined by depressing button 68 to cause a water supply signal to be transmitted to receiver 61. The receiver in turn closes the switch to the pump circuit through connections 63 to controller 41 so as to turn on pump 22 and supply water to irrigation branch 34. If desired, transmitter 66 can also be provided with indicator means, such as indicator lights, which correspond to the branch selected at any time, but such indicator means have not been found to be necessary for most systems.

When the approximate area of the break 56 is located, the water supply signal is terminated, and the repairman exposes conduit 36 and determines the exact location of the failure. The conduit is then repaired, and the repairman can thereafter transmit a second water supply signal to the receiver, which in turn starts the pump so that the repair can be tested. If the repair holds, the repairman can turn off the system by releasing button 68, and then the repairman can cover up the conduit. Not infrequently, repair will cause dirt to enter conduit 36 and be carried downstream to a subsequent sprinkler head. Accordingly, the repairman may have to proceed to the downstream sprinkler heads to clear the same out, turn the supply on to be certain that they are cleared, and then turn off the water and proceed to still another sprinkler head.

As will be appreciated, the method and apparatus of the present invention also can be used to perform such tasks as the initial setting or periodic alteration of the area which the various sprinkler heads 37 cover.

The system described and shown in FIG. 1 is an electric system in which the solenoid valves are wired to controller 41. As will be appreciated, if the controller 41 broadcasts radio frequency signals to receivers at valves 26-29, it is still possible to use the method and apparatus of the present invention by coupling receiver 61 to the controller 41 in a manner which will cause broadcasting of the requisite valve and pump control signals by the controller. Again, the connection should be made downstream of the timing function so that the repairman can instantaneously switch branches and control water flow.

Similarly, the method and apparatus of the present invention are adaptable for use with an automatic controller 41 in which the valves and/or pump 22 are hydraulically, or even pneumatically, controlled. Thus, instead of electrical conductive lines 44 and 46–49, hydraulic or pneumatic lines would extend from the controller to the valves. No return line 44 is required in a hydraulic system, since either the pressure or absence of hydraulic pressure in a single line to each valve activates the valves. Typical of such hydraulic controllers is the RAIN-CLOX Controller Model ME-11H produced by Rainbird Sprinkler Manufacturing Corp. of Glendora, Calif.

In order to use the method of the present invention with a hydraulic or a fluid actuated controller, a solenoid actuated valve must be connected to the hydraulic system used in the branch selection portion of the controller. Conductors 64 from receiver 61, therefore, would be connected to a solenoid valve (not shown) which in turn would be interposed or in fluid connection with either the fluid supply line for the branch selection control portion of the controller or the fluid drain line of the controller. Since it is possible to thereby control the branch selection control portion of the controller by mounting a solenoid valve in either the supply or drain line of the controller, it is preferable that the valve be a three-way solenoid valve. If the valve is mounted in the supply line, the system will be a normally closed system, while if the solenoid valve is mounted to the drain line, the hydraulic system will be normally open. Since the branch selection hydraulic portion conventionally includes readily identifiable supply and drain lines that can be easily disconnected from the station advance mechanism, it is relatively straightforward to interpose a solenoid actuated valve in the hydraulics of the controller.

The trouble-shooting method and apparatus of the present invention can be used with a wide range of automatic controllers for multi-branched irrigation systems. Receiver 61 may be permanently mounted to the controller in large systems or removably mounted by plug means or simply alligator clips and carried by the repairman or trouble-shooter to enable servicing of a multiplicity of such systems. The method and apparatus affords substantial time saving, reduces the number of persons required to make repairs, and effects substantial water savings by allowing the water flow to be started at any remote location from the controller and also immediately shut down.

What is claimed is:

1. A method for trouble-shooting an irrigation system having a source of water, a plurality of independent irrigation branches, valve means connecting said branches to said source of water, and a completely self-contained controller means having a water supply control portion connected for control of the flow of water to said branches from said source of water and having a branch selection control portion connected to said valve means and formed to enable selection of any one of said branches for the flow of water therein, comprising the steps of:

(a) providing a radio receiver means formed and tuned for receipt of both a water supply signal and a differing station selection signal, said receiver including actuation means formed with a first solenoid switch electrically connected for triggering by said water supply signal to actuate said water supply control portion of said controller means, said actuation means further being formed with a second solenoid switch electrically connected for triggering by said differing station select signal to actuate said branch selection control portion of said controller means;

(b) without modifying the electrical circuitry of said self-contained controller means, electrically connecting a first output connections of said radio receiver means to said water supply control of said controller means for actuation thereof;

(c) without modifying the electrical circuitry of said self-contained controller means, electrically connecting a second output connections of said radio receiver to said branch selection control portion for actuation thereof;

(d) carrying a radio transmitter formed for selective transmission of said water supply signal and said station selection signal to an area remote of said controller means and proximate a suspected source of trouble in said irrigation system;

(e) while proximate the suspected source of trouble, transmitting a station select signal to said receiver means;

(f) while proximate the suspected source of trouble, transmitting a water supply signal to said receiver means;

(g) terminating said water supply signal prior to attempting to repair said irrigation system; and (h) thereafter transmitting a second water supply signal to said receiver means to enable testing of the repaired irrigation system.

2. The method of trouble-shooting an irrigation system as defined in claim 1 wherein, said controller means is provided with timing means formed to control the timing of the flow of water through any given one of said branches; and said step of electrically connecting said first output connection is accomplished by connecting said first of said output connections to said controller means at a position by-passing said timing means.

3. The method of trouble-shooting an irrigation system as defined in claim 1 wherein, said valve means and said branch selection control portion include fluid actuated apparatus, and the additional step of:

mounting a solenoid actuated valve to said controller means in fluid connection with said branch selection control portion, and wherein, said step of electrically connecting said second output connection is accomplished by connecting said second output connection to said solenoid actuated valve.

4. The method as defined in claim 3 wherein, said solenoid actuated valve is connected to a fluid supply line for said branch selection control portion.

5. The method as defined in claim 3 wherein, said solenoid actuated valve is connected to a fluid drain line for said branch selection control portion.

6. Apparatus for trouble-shooting an irrigation system having a plurality of independent branches and controller means connected to control the flow and the timing of the flow of water in each of said branches, said apparatus including a radio receiver means formed and tuned for the receipt of two differing radio signals and having actuating means formed for actuation of said controller upon receipt of said radio signals said receiver means being electrically connected to said controller means by conductor means for the actuation of said controller means; and radio transmitter means formed for selective transmission of two differing radio signals, wherein the improvement in said apparatus is comprised of:

said receiver means being electrically connected to said controller means at an electrical position bypassing the timing function of said controller means, and said receiver means being formed for direct actuation of the branch in which water can flow and for actuation of the commencement of the flow of water; and said actuating means in said receiver is formed as a first solenoid activated switch electrically connected for triggering by one of said radio signals and a second solenoid activated switch electrically connected for triggering by a remainder of said radio signals.

7. Apparatus for trouble-shooting an irrigation system as defined in claim 6, and first plug means mounted to said controller means and electrically connected to said conductor means, second plug means formed to mate with said first plug means and carried by and electrically connected to said receiver for transmission of output signals from said receiver to said controller.

* * * * *